(12) United States Patent
Peiffer et al.

(10) Patent No.: US 6,508,848 B1
(45) Date of Patent: Jan. 21, 2003

(54) MACROMOLECULAR MATERIALS

(75) Inventors: Dennis G. Peiffer, Annandale, NJ (US);
Panagiotis Dounis, Athens (GR);
Ramah J. Brod, Oxfordshire (GB);
George R. Chludzinski, Flanders, NJ (US)

(73) Assignee: Infineum International Ltd. (GB)

( * ) Notice: Subject to any disclaimer, the term of this patent is extended or adjusted under 35 U.S.C. 154(b) by 0 days.

(21) Appl. No.: 09/857,729

(22) PCT Filed: Dec. 6, 1999

(86) PCT No.: PCT/EP99/09609

§ 371 (c)(1),
(2), (4) Date: Oct. 15, 2001

(87) PCT Pub. No.: WO00/44857

PCT Pub. Date: Aug. 3, 2000

(30) Foreign Application Priority Data

Dec. 11, 1998 (GB) .............................................. 9827366

(51) Int. Cl.$^7$ .......................... C10L 1/18; C10M 157/00
(52) U.S. Cl. .......................... 44/393; 44/395; 524/275; 508/475
(58) Field of Search .......................... 44/389, 393, 395; 508/475; 524/275

(56) References Cited

FOREIGN PATENT DOCUMENTS

| | | | |
|---|---|---|---|
| EP | 831106 | * | 3/1998 |
| WO | WO-9607718 | * | 8/1991 |

* cited by examiner

*Primary Examiner*—Cephia D. Toomer

(57) ABSTRACT

A macromolecular cold flow improver in which a crystalline moiety and an oil-solubility enhancing moiety are linked by a functional group.

7 Claims, No Drawings

MACROMOLECULAR MATERIALS

This application is a 371 of PCT/EP99/09609, filed Dec. 6, 1999.

This invention relates to additives for use in oil compositions, primarily fuel oil compositions, and more especially fuel oil compositions susceptible to wax formation at low temperatures, and to processes for the manufacture of the additives.

Fuel oils, whether derived from petroleum or from vegetable sources, contain components, e.g., alkanes, that at low temperature tend to precipitate as large crystals or spherulites of wax in such a way as to form a gel structure which causes the fuel to lose its ability to flow. The lowest temperature at which the fuel will still flow is known as the pour point.

As the temperature of the fuel falls and approaches the pour point, difficulties arise in transporting the fuel through lines and pumps. Further, the wax crystals tend to plug fuel lines, screens, and filters at temperatures above the pour point. These problems are well recognized in the art, and various additives have been proposed, many of which are in commercial use, for depressing the pour point of fuel oils. Similarly, other additives have been proposed and are in commercial use for reducing the size and changing the shape of the wax crystals that do form. Smaller size crystals are desirable since they are less likely to clog a filter.

The wax from a diesel fuel, which is primarily an alkane wax, crystallizes as platelets; certain additives inhibit this and cause the wax to adopt an acicular habit, the resulting needles being more likely to pass through a filter than are platelets. The additives may also have the effect of retaining in suspension in the fuel the crystals that have formed, the resulting reduced settling also assisting in prevention of blockages.

Effective wax crystal modification (as measured by cold filter plugging point (CFPP) and other operability tests, as well as simulated and field performance) is achieved by ethylene-vinyl acetate (EVAC) or propionate copolymer-based flow improvers.

It has over a long period—see, for example, U.S. Pat. No. 3,600,311—been proposed to employ hydrogenated diene copolymers, having one or more crystalline, or crystallizable, regions and one or more non-crystallizable regions, as cold flow improvers. These materials are effective wax crystal modifiers, or nucleators, but have the disadvantage that their manufacture, involving a lithium-containing polymerization catalyst, at least two-stage polymerization and subsequent hydrogenation, is expensive.

The present invention provides a macromolecular material of the formula AB, comprising a moiety A having a molecular weight within the range of from 400 to 7000, and containing an alkyl or alkylene chain, and having a linearity such that its degree of crystallinity is at least 25%, and a moiety B imparting oil solubility to the material, moiety B having a degree of crystallinity of at most 10%, the moieties A and B being linked by a bond other than a carbon to carbon bond, or being linked by a functional group, advantageously one that is the reaction product of nucleophilic and electrophilic groups. For simplicity, this material will be referred to below as the macromolecular material of the invention.

The additive composition of this invention comprises the foregoing macromolecular material in combination with a terpolymer of ethylene, vinyl acetate, and a vinyl ester of a $C_2$ to $C_{10}$ alkane carboxylic acid.

In one embodiment of the invention, moiety A is, or comprises, an ethylene-based polymer, either a homopolymer or a copolymer. The polymer may be obtained by polymerization of ethylene, optionally with up to 15, preferably up to 8, and most preferably up to 5, molar percent of one or more ethylenically unsaturated co-monomers, advantageously ethylenically unsaturated hydrocarbons, such as olefins, having from 3 to 16, advantageously from 3 to 8, carbon atoms. Alpha-olefines are preferred, for example propene or a butene.

An ethylene-based moiety A may be prepared, for example, by Ziegler-Natta polymerization, or by metallocene/alumoxane catalysed polymerization, in which case it advantageously contains, before linkage, at least 30%, more advantageously at least 50%, preferably at least 60%, and most preferably 75 to 95%, terminal ethenylidene unsaturation, and is prepared as described in EP-A-353 935, the entire disclosure of which is incorporated herein by reference, as are those of WO 91/11469 and WO 94/13709, the specifications also describing ways in which polymer moiety A may be provided with an electrophilic or nucleophilic group to link it to a moiety B. Alternatively the polymer may be obtained by polymerization using alpha-omega enchainment of a linear diene, especially butadiene, and subsequent hydrogenation. The linear diene may be polymerized alone or with a branched co-monomer, in a manner that provides some alpha-beta enchainment, and hence some branching, provided that the required degree of crystallinity is achieved. Hydrogenated polybutadiene is preferred.

In a further embodiment, moiety A is, or comprises, a wax. Advantageously the wax is one containing a major proportion by weight of n-alkanes, and preferably the n-alkane content is at least 30%. The wax advantageously contains an ethylenically unsaturated group, or some other reactive group, all such groups advantageously being terminal groups.

Alternatively the wax may be used to alkylate a phenol, the hydroxyl group of which forms the link to moiety B.

An advantageous molecular weight range for moiety A is from 1000 to 5000; from 1000 to 3000 is preferred and about 1500 is most preferred. When moiety A is a polymer or a wax, the molecular weight is Mn, as measured by GPC.

The degree of crystallinity of moiety A may be determined by X-ray diffraction and DSC. Advantageously, the degree of crystallinity is at least 30% and is preferably at least 40%.

Turning now to moiety B, this is advantageously a polymeric material, and whether or not it is polymeric advantageously has a molecular weight (Mn in the case of a polymer) within the range of from 1000 to 70,000, more advantageously from 2000 to 20,000, preferably from 2000 to 10,000, and most preferably from 5000 to 6000.

The molecular weights of the two moieties are advantageously of the same order; preferably the molecular weight of the B moiety is from 1 to 5 times that of the A moiety.

Moiety B is advantageously an ethylene-based homo or copolymer. Like moiety A, it may be obtained by polymerization of ethylene, with one or more ethylenically unsaturated, preferably hydrocarbon, comonomers, which is or are present in a proportion, for example at least 20, and preferably at least 30, molar percent, sufficiently high to give a polymer with a sufficiently low crystallinity. Alternatively, it may be an ethylene homopolymer prepared in such a way as to give a high degree of branching, i.e., one having at least 10 $CH_3$ groups per 100 $CH_2$ groups. The polymer may be prepared, as described above with reference to moiety A, by for example Ziegler-Natta or metallocene/alumoxane catalysed polymerization.

Polymers based on one or more olefinic hydrocarbon monomers other than ethylene may also be used, especially those containing from 3 to 10, more especially 3 to 5, carbon atoms. Such monomers include for example, propene, n- and iso-butene, 1-pentene, 1-octene, and styrene. Preferred examples of monomers and monomer mixtures are propene, propene/iso-butene, n-butene/iso-butene and, especially, isobutene.

Further, the polymer may be obtained by at least partly 1,2-configuration polymerization of a linear diene, by polymerization of a branched diene, or by a combination of such polymerizations, and subsequent hydrogenation. Suitable dienes include, for example, butadiene, isoprene, and 2,3-dimethylbutadiene. Mixed 1,2 and 1,4 polymerization of butadiene provides on hydrogenation an ethylene-butene type polymer, while isoprene yields an ethylene-propene type material.

Moiety B is advantageously a hydrocarbon polymer, and preferably is predominantly a saturated or unsaturated aliphatic chain. It may, like moiety A, contain an aromatic ring close or adjacent to the linkage with the other moiety.

The hydrocarbyl chain may optionally be interrupted by one or more hetero atoms, for example, oxygen atoms, as in a chain containing polyoxy-alkylene groups.

The degree of crystallinity of the B moiety is advantageously at most 7%, and preferably at most 5%. Most preferably the B moiety is amorphous.

The moiety B is desirably per se oil-soluble, and is advantageously soluble in the oil that the material of the invention is to treat, forming a substantially homogeneous composition that is stable over time. By the nature of its function, however, at least some of the material of the invention is expected to come out of solution in association with wax crystals as the oil temperature is reduced to near its cloud point.

The nature of the linkage between the moieties is not itself critical nor are its orientation and location on the moieties, though terminal locations on each are preferred. Where, however, one moiety contains, for example, a divalent linking group, e.g., a dicarboxylic group, then more than one chain may form the other moiety, or that other moiety may be regarded as linked in a non-terminal location even if each chain were to be linked at its end. In any such case, it is the sum of the molecular weights of the chains that is to be regarded as to be within the molecular weight ranges referred to above.

Also within the scope of the invention are macromolecular materials containing more than one moiety A or B, which may be the same or different. For example, the material may comprise a moiety A having a moiety B at each end, at least one moiety B, and preferably both moieties B, being linked by the nucleophile-electrophile reaction product or, and preferably, the material may comprise a moiety B having a moiety A at each end, at least one linkage and preferably both being the nucleophile-electrophile reaction product.

As examples of reactive groups there may be mentioned those derived from an amine, alcohol, aminoalcohol, phosphine, thiol or organometallic compound, for example, hydrocarbyl lithium.

As examples of electrophilic groups there may be mentioned those derived from acids for example, acid chlorides and anhydrides and other acylating agents.

An electrophilic or nucleophilic group may be introduced into the moiety A or B by a method appropriate to the polar group concerned. For example, a hydroxy group may be introduced by reaction with ethylene oxide or propylene oxide in the presence of a basic catalyst (e.g., lithium hydroxide) and subsequent reaction with a proton donor (e.g., a carboxylic acid) to form the hydroxide, or by the ethylene oxide treatment described in U.S. Pat. No. 3,135,716, the entire disclosure of which is incorporated by reference herein. A further method for introducing a hydroxy group into a polymeric moiety is by polymerizing in the presence of a peroxide, e.g., hydrogen peroxide, as described in U.S. Pat. No. 3,446,740, the disclosure of which is incorporated by reference herein. The hydroxy group may, in turn, provide a site for further reaction to yield other appropriate groups.

A carboxy group may be introduced by treatment of the polymer with $CO_2$, also as described in U.S. Pat. No. 3,135,716, and if desired may, in the same way as the hydroxy group, be used as a further reaction site.

A moiety with ethylenic unsaturation, especially terminal unsaturation, may have that nucleophilic group replaced by another type of nucleophilic group, e.g., a hydroxy group. An example of this procedure is the addition of a phenol to a terminally unsaturated polymer or wax, as will be described in more detail in the examples below.

Each moiety may be functionalized to incorporate a functional, especially an electrophilic or nucleophilic, group either terminally, or as one or more groups pendant from the polymer backbone. The functional group typically will be polar and contain one or more hetero atoms such as P, O, S, N, B or Hal. It may be attached to a saturated hydrocarbon part of the moiety by a substitution reaction or to an olefinic portion by an addition or cycloaddition reaction. Alternatively, the functional group may be incorporated in conjunction with oxidation or cleavage of the moiety chain end (e.g., as in ozonolysis).

Among examples of providing functionality, there may be mentioned more especially the "ene" reaction with unsaturated mono or dicarboxylic acids or anhydrides, especially maleic anhydride, followed by reaction of the carboxylic group or groups with a nucleophilic reactant, for example, an alcohol, aminoalcohol, or amine.

Functionality may be provided by other means, for example, by oxidation, hydroformylation, epoxidation, reaction with a hydroxyaromatic compound or by the Koch reaction. Provision of functionality by the Koch reaction is described in International Application No. WO 94/13709, the entire disclosure of which is incorporated herein by reference. According to the procedure described in the International Application, a terminal ethenylidene group is treated with carbon monoxide in the presence of an acid catalyst and a nucleophilic trapping agent, and the resulting acidic group subsequently treated, as described above, by a nucleophilic reactant.

The present invention also provides an additive composition comprising a acromolecular material of the invention and a cold flow improver other than the acromolecular material of the invention. As examples of such cold flow provers, there may be mentioned:

(A) ethylene-unsaturated ester compounds,
(B) comb polymers,
(C) polar nitrogen compounds,
(D) hydrocarbon polymers,
(E) hydrocarbyl esters of amine-substituted carboxylic acids,
(F) poly(meth)acrylate esters,
(G) polyoxyalkylene compounds, and
(H) a mixture of saturated hydrocarbons, at least some of which have a number of carbon atoms within the range of 15 to 60.

In the preferred embodiments of the invention, the additional cold flow improver may be:

(A) an ethylene-unsaturated ester copolymer, more especially one having, in a dition to units derived from ethylene, units the formula

—CR³R⁴—CHR⁵— wherein $R^3$ represents hydrogen or methyl, $R^4$ represents $COOR^6$, wherein $R^6$ represents an alkyl group having from 1 to 9 carbon atoms, which is straight chain or, if it contains 3 or more carbon atoms, branched, or $R^4$ represents $OOCR^7$, wherein $R^7$ represents $R^6$ or H, and $R^5$ represents H or $COOR^6$.

These may comprise a copolymer of ethylene with an ethylenically unsaturated ester, or derivatives thereof. An example is a copolymer of ethylene with an ester of a saturated alcohol and an unsaturated carboxylic acid, but preferably the ester is one of an unsaturated alcohol with a saturated carboxylic acid. An ethylene-vinyl ester copolymer is advantageous; an ethylene-vinyl acetate, ethylene-vinyl propionate, ethylene-vinyl hexanoate, or ethylene-vinyl octanoate copolymer is preferred.

As disclosed in U.S. Pat. No. 3,961,916, flow improver compositions may comprise a wax growth arrestor and a nucleating agent. Without wishing to be bound by any theory, the applicants believe that the macromolecular material of the invention acts primarily as a nucleator and will benefit from the presence of an arrest or. This may, for example, be an ethylene-unsaturated ester as described above, especially an EVAC with a molecular weight (Mn, measured by gel permeation chromatography against a polystyrene standard) of at most 14000, advantageously at most 10,000, preferably 2000 to 6000, and more preferably from 2000 to 5500, and an ester content of 7.5% to 35%, preferably from 10 to 20, and more preferably from 10 to 17, molar percent.

It is within the scope of the invention to include an additional nucleator, e.g., an etylene-unsaturated ester, especially vinyl acetate, copolymer having a number average molecular weight in the range of 1200 to 20000, and a vinyl ester content of 0.3 to 10, advantageously 3.5 to 7.0 molar per cent.

(B) A comb polymer.

Such polymers are discussed in "Comb-Like Polymers. Structure and Properties", N. A. Platé and V. P. Shibaev, J. Poly. Sci. Macromolecular Revs., 8, p 117 to 253 (1974).

Advantageously, the comb polymer is a homopolymer having, or a copolymer at least 25 and preferably at least 40, more preferably at least 50, molar per cent of the units of which have, side chains containing at least 6, and preferably at least 10, atoms.

As examples of preferred comb polymers there may be mentioned those of the general formula

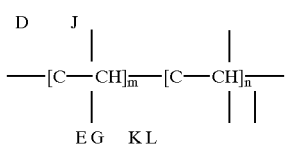

wherein D=$R^{11}$, $COOR^{11}$, $OCOR^{11}$, $R^{12}COOR^{11}$, or $OR^{11}$,
E=H, $CH_3$, D, or $R^{12}$,
G=H or D
J=H, $R^{12}$, $R^{12}COOR^{11}$, or an aryl or heterocyclic group,
K=H, $COOR^{12}$, $OCOR^{12}$, $OR^{12}$, or COOH,
L=H, $R^{12}$, $COOR^{12}$, $OCOR^{12}$, COOH, or aryl,
$R^{11} \geq C_{10}$ hydrocarbyl,
$R^{12} \geq C_1$ hydrocarbyl or hydrocarbylene,
and m and n represent mole ratios, m being within the range of from 1.0 to 0.4, n being in the range of from 0 to 0.6. $R^{11}$ advantageously represents a hydrocarbyl group with from 10 to 30 carbon atoms, while $R^{12}$ advantageously represents a hydrocarbyl or hydrocarbylene group with from 1 to 30 carbon atoms.

The comb polymer may contain units derived from other monomers if desired or required. It is within the scope of the invention to include two or more different comb copolymers.

These comb polymers may be copolymers of maleic anhydride or fumaric acid and another ethylenically unsaturated monomer, e.g., an α-olefin or an unsaturated ester, for example, vinyl acetate. It is preferred but not essential that equimolar amounts of the comonomers be used although molar proportions in the range of 2 to 1 and 1 to 2 are suitable. Examples of olefins that may be copolymerized with e.g., maleic anhydride, include 1-decene, 1-dodecene, 1-tetradecene, 1-hexadecene, and 1-octadecene.

The copolymer may be esterified by any suitable technique and although preferred it is not essential that the maleic anhydride or fumaric acid be at least 50% esterified. Examples of alcohols which may be used include n-decan-1-ol, n-dodecan-1-ol, n-tetradecan-1-ol, n-hexadecan-1-ol, and n-octadecan-1-ol. The alcohols may also include up to one methyl branch per chain, for example, 1-methylpentadecan-1-ol, 2-methyltridecan-1-ol. The alcohol may be a mixture of normal and single methyl branched alcohols. It is preferred to use pure alcohols rather than the commercially available alcohol mixtures but if mixtures are used the $R^{12}$ refers to the average number of carbon atoms in the alkyl group; if alcohols that contain a branch at the 1 or 2 positions are used $R^{12}$ refers to the straight chain backbone segment of the alcohol.

These comb polymers may especially be fumarate or itaconate polymers and copolymers such for example as those described in EP-A-153176, 153177 and 225688, and WO 91/16407.

Particularly preferred fumarate comb polymers are copolymers of fumarates, preferably alkyl fumarates, and vinyl acetate, in which the alkyl groups have from 12 to 20 carbon atoms, more especially polymers in which the alkyl groups have 14 carbon atoms or in which the alkyl groups are a mixture of $C_{14}/C_{16}$ alkyl groups, made, for example, by solution copolymerizing an equimolar mixture of fumaric acid and vinyl acetate and reacting the resulting copolymer with the alcohol or mixture of alcohols, which are preferably straight chain alcohols. When the mixture is used it is advantageously a 1:1 by weight mixture of normal $C_{14}$ and $C_{16}$ alcohols. Furthermore, mixtures of the $C_{14}$ ester with the mixed $C_{14}/C_{16}$ ester may advantageously be used. In such mixtures, the ratio of $C_{14}$ to $C_{14}/C_{16}$ is advantageously in the range of from 1:1 to 4:1, preferably 2:1 to 7:2, and most preferably about 3:1, by weight.

Other suitable comb polymers are the polymers and copolymers of a-olefins and esterified copolymers of styrene and maleic anhydride, and esterified copolymers of styrene and fumaric acid; mixtures of two or more comb polymers may be used in accordance with the invention and, as indicated above, such use may be advantageous.

(C) An ionic or non-ionic polar nitrogen compound.

Such compounds, which are oil-soluble, advantageously include at least one, preferably at least two, substituents of the formula >$NR^8$, where $R^8$ represents a hydrocarbyl group containing 8 to 40 carbon atoms, which substituent or one or more of which substituents may be in the form of a cationic derivative. As examples there may be mentioned the following groups of compounds:

(a) An amine salt and/or amide obtainable by the reaction of at least one molar proportion of a hydrocarbyl substituted amine with a molar proportion of a hydrocarbyl acid having from 1 to 4 carboxylic acid groups or an anhydride thereof, the substituent(s) having the formula $>NR^8$ advantageously being of the formula $—NR^8R^9$ where $R^8$ is as defined above and $R^9$ represents hydrogen or $R^8$, provided that $R^8$ and $R^9$ may be the same or different, said substituents constituting part of the amine salt and/or amide groups of the compound.

Advantageously, ester/amides containing 30 to 300, preferably 50 to 150, total carbon atoms are used, these nitrogen compounds being described in U.S. Pat. No. 4,211,534. Preferred amines are $C_{12}$ to $C_{40}$ primary, secondary, tertiary or quaternary amines or mixtures thereof, although shorter chain amines may be used provided the resulting nitrogen compound is oil soluble. The nitrogen compound advantageously contains at least one linear $C_8$ to $C_{40}$, preferably $C_{14}$ to $C_{24}$, alkyl segment.

Secondary amines are preferred, tertiary and quaternary amines only forming amine salts. As examples of amines there may be mentioned tetradecylamine, cocoamine, and hydrogenated tallow amine. Examples of secondary amines include dioctadecylamine and methyl-behenylamine. Amine mixtures are also suitable, for example, those derived from natural materials. A preferred amine is a secondary hydrogenated tallow amine of the formula $HNR^{13}R^{14}$ wherein $R^{13}$ and $R^{14}$ are alkyl groups derived from hydrogenated tallow fat (normally composed of approximately 4% $C_{14}$, 31% $C_{16}$, 59% $C_{18}$ alkyl groups).

Examples of suitable carboxylic acids and their anhydrides for preparing the nitrogen compounds include cyclohexane-1,2-dicarboxylic acid, cyclohexene-1,2-dicarboxylic acid, cyclopentane-1,2-dicarboxylic acid and naphthalene dicarboxylic acid, and 1,4-dicarboxylic acids including dialkyl spirobislactone. Generally, these acids have from 5 to 13 carbon atoms in the cyclic moiety. Preferred acids are the benzene dicarboxylic acids, phthalic acid, isophthalic acid, and terephthalic acid. Phthalic acid or its anhydride is particularly preferred. The particularly preferred compound is the amide-amine salt formed by reacting 1 molar portion of phthalic anhydride with 2 molar portions of hydrogenated tallow amine, preferably secondary hydrogenated tallow amine. Another preferred compound is the diamide formed by dehydrating this amide-amine salt.

Other examples are long chain alkyl or alkenyl substituted dicarboxylic acid derivatives, for example the amine salts of monoamides of substituted succinic acids, examples of which are known in the art and described, for example, in U.S. Pat. No. 4,147,520. Suitable amines may be those described above.

Other examples are condensates, for example, those described in EP-A-327,423.

(b) A compound comprising a ring system, the compound carrying at least two, but preferably only two, substituents of the formula $—A—NR^{15}R^{16}$ on the ring system where A is an aliphatic hydrocarbylene group optionally interrupted by one or more hetero atoms and that is straight chain or branched, and $R^{15}$ and $R^{16}$ are the same or different and each is independently a hydrocarbyl group containing 9 to 40, advantageously from 16 to 40, preferably from 16 to 24, carbon atoms, optionally interrupted by one or more hetero atoms, the substituents being the same or different and the compound optionally being in the form of a salt thereof. Advantageously, $R^{15}$ and $R^{16}$ are linear, and advantageously $R^{15}$ and $R^{16}$ are alkyl, alkenyl, or an alkyl-terminated mono- or polyoxyalkylene group.

Advantageously, A contains from 1 to 20 carbon atoms and is preferably a methylene or polymethylene group.

The ring system may comprise homocyclic, heterocyclic, or fused polycyclic assemblies, or a system where two or more such cyclic assemblies are joined to one another, and in which the cyclic assemblies may be the same or different. Where there are two or more such cyclic assemblies, the substituents of the formula $—A—NR^{15}R^{16}$ may be on the same or different assemblies, but are preferably on the same assembly. Preferably, the or each cyclic assembly is aromatic, more preferably a benzene ring. Most preferably, the cyclic ring system is a single benzene ring, when it is preferred that the substituents are in the ortho or meta positions, the ring being optionally further substituted.

The ring atoms in the cyclic assembly or assemblies are preferably carbon atoms but may for example include one or more ring N, S or O atoms.

Examples of polycyclic assemblies include condensed benzene structures, e.g., naphthalene, anthracene, phenanthrene, and pyrene;
condensed ring structures containing rings other than benzene, e.g., azulene, indene, hydroindene, fluorene, and diphenylene oxides:
rings joined "end-on", e.g., diphenyl;
heterocyclic compounds e.g., quinoline, indole, 2,3-dihydroindole, benzofuran, coumarin, isocoumarin, benzothiophen, carbazole and thiodiphenylamine;
non-aromatic or partially saturated ring systems e.g., decalin (decahydronaphthalene), α-pinene, cardinene, and bornylene; and
bridged ring structures e.g., norbornene, bicycloheptane (i.e. norbornane), bicyclooctane, and bicyclooctene.

(c) A condensate of a long chain primary or secondary amine with a carboxylic zicid-containing polymer.

Specific examples include the polymers described in GB-A-2,121,807, FR-A-2,592,387 and DE-A-3,941,561; the esters of telomer acids and alkanoloamines described in U.S. Pat. No. 4,639,256; and the reaction product of an amine containing a branched carboxylic acid ester, an epoxide and a monocarboxylic acid polyester described in U.S. Pat. No. 4,631,071.

(D) Hydrocarbon polymers.

These are advantageously copolymers of ethylene and at least one α-olefin, having a number average molecular weight of at least 30,000. Preferably the α-olefin has at most 20 carbon atoms. Examples of such olefins are propylene, 1-butene, isobutene, n-octene-1, isooctene-1, n-decene-1, and n-dodecene-1. The copolymer may also comprise small amounts, e.g., up to 10% by weight of other copolymerizable monomers, for example olefins other than α-olefins, and non-conjugated dienes. The preferred copolymer is an ethylene-propylene copolymer. It is within the scope of the invention to include two or more different ethylene-α-olefin copolymers of this type.

The number average molecular weight of the ethylene-α-olefin copolymer is, as indicated above, at least 30,000, as measured by GPC relative to polystyrene standards, advantageously at least 60,000 and preferably at least 80,000. Functionally no upper limit arises but difficulties of mixing result from increased viscosity at molecular weights above about 150,000, and preferred molecular weight ranges are from 60,000 and 80,000 to 120,000.

Advantageously, the copolymer has a molar ethylene content between 50 and 85 percent. More advantageously, the ethylene content is within the range of from 57 to 80%, and preferably it is in the range from 58 to 73%; more preferably from 62 to 71 %, and most preferably 65 to 70%.

Preferred ethylene-o-olefin copolymers are ethylene-propylene copolymers with a molar ethylene content of from 62 to 71 % and a number average molecular weight in the range 60,000 to 120,000; especially preferred copolymers are ethylene-propylene copolymers with an ethylene content of from 62 to 71% and a molecular weight from 80,000 to 100,000.

The copolymers may be prepared by any of the methods known in the art, for example using a Ziegler type catalyst. The polymers should be substantially amorphous, since highly crystalline polymers are relatively insoluble in fuel oil at low temperatures.

The additive composition may also comprise a further ethylene-α-olefin copolymer, advantageously with a number average molecular weight of at most 7500, advantageously from 1,000 to 6,000, and preferably from 2,000 to 5,000, as measured by vapour phase osmometry. Appropriate α-olefins are as given above, or styrene, with propylene again being preferred. Advantageously the ethylene content is from 60 to 77 molar per cent although for ethylene-propylene copolymers up to 86 molar per cent by weight ethylene may be employed with advantage.

(E) Hydrocarbyl esters.

As preferred materials of this type, there may be mentioned $C_8$ to $C_{32}$ hydrocarbyl esters of tertiary amine-substituted aliphatic carboxylic acids. More especially, there may be mentioned compounds of the formula $$(R^{21}R^{22}N)_e\text{—}G\text{—}(NR^{21}R^{23})_f$$

or $JNR^{21}{}_2$ wherein G represents an (e+f) valent and J represents a monovalent hydrocarbon radical optionally interrupted by at least one heteroatom selected from oxygen and nitrogen, each $R^{21}$ independently represents $$\text{—}CHR^{24}(CHR^{25})_p COOR^{26,}$$

$R^{22}$ and $R^{23}$ each independently represent $R^{21}$, H, or an alkyl group containing from 1 to 8 carbon atoms, $R^{24}$ and $R^{25}$ each independently represent H or an alkyl group containing from 1 to 8 carbon atoms, $R^{26}$ represents a hydrocarbyl group containing from 8 to 32 carbon atoms optionally interrupted by at least one hetero atom selected from oxygen and nitrogen, e and f each represent an integer up to 12 or zero provided that the total number of $R^{21}$ groups is at least 2, and p represents zero or an integer within the range of from 1 to 4. Further details of such compounds are set out in International Application WO98/03614, the disclosure of which is incorporated by reference herein.

Advantageously, G or J represents a radical containing from 1 to 200, preferably from 2 to 65, carbon atoms. G or J may represent a saturated aliphatic radical or a radical of the formula $$\text{—}[CH(CH_3)CH_2O]_a\text{—}[CH_2CH_2O]_b\text{—}[CH_2CH(CH_3)O]_c\text{—}CH_2CH(CH_3)\text{—},$$

where a+c is within the range of 2 to 4 and b is within the range of 5 to 100.

A preferred member of this group is a $C_{18}$ to $C_{22}$ mixed alkyl tetraester of hexane diamine tetrapropionic acid.

(F) Poly(meth)acrylate esters.

Advantageously, these materials are acrylate and methacrylate, hereinafter collectively referred to as (meth) acrylate, homo- and co-polymers. Examples of such polymers are copolymers of (meth)acrylic esters of at least two, linear or branched, alkanols containing various numbers of carbon atoms, e.g., from 6 to 40, especially copolymers of methacrylic esters of $C_{18}$ to $C_{22}$ linear alkanols, optionally together with an olefinic monomer, e.g., ethylene, or a nitrogen-containing monomer, e.g., N-vinyl pyridine or a dialkylaminoalkyl (meth)acrylate. The weight average molecular weight, as measured by GPC, of the polymer is advantageously within the range of from 50,000 to 500,000. A presently preferred polymer of this type is a copolymer of methacrylic acid and a methacrylic ester of $C_{14}/C_{15}$ saturated alcohols (1:9 molar ratio), the acid groups being neutralized with di(hydrogenated tallow) amine.

(G) A polyoxyalkylene compound.

Examples are polyoxyalkylene esters, ethers, ester/ethers and mixtures thereof, particularly those containing at least one, preferably at least two, $C_{10}$ to $C_{30}$ linear alkyl groups and a polyoxyalkylene glycol group of molecular weight up to 5,000, preferably 200 to 5,000, the alkyl group in said polyoxyalkylene glycol containing from 1 to 4 carbon atoms. These materials form the subject of EP-A-0 061 895. Other such additives are described in U.S. Pat. No. 4,491,455.

The preferred esters, ethers or ester/ethers are those of the general formula $$R^{31}\text{—}O(L)\text{—}O\text{—}R^{32}$$

where $R^{31}$ and $R^{32}$ may be the same or different and represent (a) n-alkyl-
(b) n-alkyl-CO—
(c) n-alkyl-O-CO(CH$_2$)$_x$— or
(d) n-alkyl-O-CO(CH$_2$)$_x$—CO— x being, for example, 1 to 30, the alkyl group being linear and containing from 10 to 30 carbon atoms, and L representing the polyalkylene segment of the glycol in which the alkylene group has 1 to 4 carbon atoms, such as a polyoxymethylene, polyoxyethylene or polyoxytrimethylene moiety which is substantially linear; some degree of branching with lower alkyl side chains (such as in polyoxypropylene glycol) may be present but it is preferred that the glycol is substantially linear. L may also contain nitrogen.

Examples of suitable glycols are substantially linear polyethylene glycols (PEG) and polypropylene glycols (PPG) having a molecular weight of from 100 to 5,000, preferably from 200 to 2,000. Esters are preferred and fatty acids containing from 10–30 carbon atoms are useful for reacting with the glycols to form the ester additives, it being preferred to use a $C_{18}$–$C_{24}$ fatty acid, especially behenic acid. The esters may also be prepared by esterifying polyethoxylated fatty acids or polyethoxylated alcohols.

Polyoxyalkylene diesters, diethers, ether/esters and mixtures thereof are suitable as additives, diesters being preferred for use in narrow boiling distillates, when minor amounts of monoethers and monoesters (which are often formed in the manufacturing process) may also be present. It is preferred that a major amount of the dialkyl compound be present. In particular, stearic or behenic diesters of polyethylene glycol, polypropylene glycol or polyethylene/polypropylene glycol mixtures are preferred.

Other examples of polyoxyalkylene compounds are those described in Japanese Patent Publication Nos. 2-51477 and 3-34790, and the esterified alkoxylated amines described in EP-A-117,108 and EP-A-326,356.

(H) A saturated hydrocarbon mixture.

Advantageously, the saturated hydrocarbon mixture, component (H), comprises normal (linear) alkanes. Advantageously, the mixture has a boiling range from about 230 to 510° C. Advantageously, the mixture contains a spread of at least 16 carbon atoms from the lowest to the highest carbon number. Preferably, the mixture contains substantial proportion of $C_{24}$ to $C_{32}$, more preferably a substantial proportion of $C_{24}$ to $C_{28}$, hydrocarbons, by weight. Advantageously, the number average molecular weight is in the range of 350 to 450. Advantageously, the mixture is a wax.

Waxes have conventionally been defined by reference to their physical characteristics, in view of the large and varied number of hydrocarbon components which they contain, and the difficulties in separating such closely related, and often homologous, hydrocarbon molecules. "Industrial Waxes", H. Bennett, 1975, describes the different types of petroleum wax and indicates that the characteristics of melting point and refractive index have proved useful in classifying the variety of waxes available from different sources. Waxes are also typically described in terms of their n-alkane content.

When component (H) is a mixture of mixtures, especially two or more mixtures of normal and non-normal alkanes, this may be apparent from chromatographic characterization, which would show a bi- or multi-modal distribution of carbon numbers. In general, an n-alkane wax has a maximum in the carbon number distribution at a lower carbon number than does a non n-alkane wax.

The wax may be an n-alkane wax or non n-alkane wax. The term "n-alkane wax" is used in this specification to mean a wax which comprises 40% or more n-alkanes by weight, based on the total weight of that wax. Similarly, the term, "non n-alkane wax" is used in this specification to mean a wax which comprises less than 40% n-alkanes by weight, based on the total weight of that wax. Preferably, an n-alkane wax contains at least 55%, more preferably at least 60%, n-alkanes by weight. Preferably, a non n-alkane wax contains less than 35%, more preferably less than 30%, for example less than 20% or 15%, n-alkanes by weight.

More preferably, the n-alkane wax is a slack wax, for example, a slack wax obtained from dewaxing of heavy gas oils having viscosities equivalent to the lubricant viscosity ranges of 90 neutral to 400 neutral, for example: slackwax 90 neutral, slackwax 130 neutral, slackwax 150 neutral and slackwax 400 neutral. Such waxes normally comprise a range of hydrocarbon components containing between 15 and 60 carbon atoms, with the n-alkane distribution typically being n-$C_{15}$ to n-$C_{15}$, for example, n-$C_5$ to n-$C_{45}$.

Further examples of n-alkane waxes suitable for use in this invention include the various grades of "Shell wax", particularly Shellwax 130/135 and 125/130.

The non n-alkane wax may be a slackwax derived from a heavier viscosity stream (for example, slackwax 600 neutral) or a petrolatum or foots oil material.

The non n-alkane wax is preferably one having a melting point of 42 to 59° C. and a refractive index of 1.445 to 1.458. (Refractive index as used in this specification is measured according to ASTM D1747-94, at a temperature of 70° C.) The melting point of a non n-alkane wax useful in the present invention is advantageously in the range of 44° C. to 55° C., preferably 45° C. to 53° C., and more preferably 47° C. to 53° C. Melting point as used in this specification is measured according to ASTM D938.

The refractive index of a wax useful in the present invention is preferably in the range of 1.445 to 1.455, more preferably in the range of 1.447 to 1.454, and most preferably in the range of 1.445 to 1.453, particularly in the range of 1.451 to 1.453.

Particularly suitable non n-alkane waxes have the following combinations of melting point and refractive index, measured according to the above-defined tests:

(i) advantageously a melting point in the range of 42° C. to 59° C. and a refractive index in the range of 1.445 to 1.455;

(ii) preferably a melting point in the range of 44° C. to 55° C. and a refractive index in the range of 1.447 to 1.454;

(iii) more preferably a melting point in the range of 45° C. to 53° C. and a refractive index in the range of 1.445 to 1.453; and (iv) most preferably a melting point in the range of 47° C. to 53° C. and a refractive index in the range of 1.451 to 1.453.

Surprisingly, it has been found that mixtures of different petroleum waxes have properties particularly useful for improving the low temperature flow properties of oils, and especially fuel oils, e.g., middle distillate fuel oils. Whilst not wishing to be bound by any particular theory, it is postulated that wax mixtures possess a combination of components which interact very favourably with precipitating n-alkanes present within the oil and with any further low temperature flow improver also present in the oil, such that the detrimental effects of precipitation of the wax inherent in the oil are reduced or even prevented.

Mixtures of two or more such waxes may show better performance in low temperature flow improver applications than a single wax.

Preferred wax mixtures are those in which at least one wax is an n-alkane wax and at least one wax is a non n-alkane wax.

Additives comprising one or more n-alkane slack waxes with one or more of the above forms of wax (i) to (iv) are particularly advantageous as flow improver compositions.

In a mixture of waxes, more than one of each type of wax may be used with advantage.

The different waxes used are typically obtained by appropriate separation and fractionation of different wax-containing distillate fractions, and are available from wax suppliers.

As used in this specification the terms "hydrocarbyl" and "hydrocarbylene" refer to a group having a carbon atom directly attached to the rest of the molecule and having a hydrocarbon or predominantly hydrocarbon character. Among these, there may be mentioned hydrocarbon groups, including aliphatic, (e.g., alkyl or alkenyl), alicyclic (e.g., cycloaltkyl or cycloalkenyl), aromatic, aliphatic and alicyclic-substituted aromatic, and aromatic-substituted aliphatic and alicyclic groups. Aliphatic groups are advantageously saturated. These groups may contain non-hydrocarbon substituents provided their presence does not alter the predominantly hydrocarbon character of the group. Examples include keto, halo, hydroxy, nitro, cyano, alkoxy and acyl. If the hydrocarbyl group is substituted, a single (mono) substituent is preferred. Examples of substituted hydrocarbyl groups include 2-hydroxyethyl, 3-hydroxypropyl, 4-hydroxybutyl, 2-ketopropyl, ethoxyethyl, and propoxypropyl. The groups may also or alternatively contain atoms other than carbon in a chain or ring otherwise composed of carbon atoms. Suitable hetero atoms include, for example, nitrogen, sulfur, and, preferably, oxygen. Advantageously, the hydrocarbyl group contains at most 30, preferably at most 15, more preferably at most 10 and most preferably at most 8, carbon atoms.

The composition may contain two or more macromolecular materials of the invention, and/or two or more other cold flow improvers, which may come from the same category, of A to H, or from different categories.

The invention also provides an oil containing the macromolecular material or the additive composition of the invention, and an additive concentrate comprising the macromolecular material or the additive composition of the invention in admixture with an oil or a solvent miscible with the oil. The invention further provides the use of the macromolecular material or the additive composition of the invention to improve the low temperature properties of an oil. The oil may be a crude oil, i.e. oil obtained directly from drilling and before refining, the compositions of this invention being suitable for use as flow improvers therein.

The oil may be a lubricating oil, which may be an animal, vegetable or mineral oil, such, for example, as petroleum oil fractions ranging from naphthas or spindle oil to SAE 30, 40 or 50 lubricating oil grades, castor oil, fish oils or oxidized mineral oil. Such an oil may contain additives depending on its intended use; examples are viscosity index improvers such as ethylene-propylene copolymers, succinic acid based dispersants, metal containing dispersant additives and zinc dialkyl-dithiophosphate antiwear additives. The compositions of this invention may be suitable for use in lubricating oils as flow improvers, pour point depressants or dewaxing aids.

The oil may be a fuel oil, especially a middle distillate fuel oil. Such distillate fuel oils generally boil within the range of from 110° C. to 500° C., e.g. 150° to 400° C.

The invention is applicable to middle distillate fuel oils of all types, including the broad-boiling distillates, i.e., those having a 90%–20% boiling temperature difference, as measured in accordance with ASTM D-86, of 100° C. or more and an FBP—90% of 30° C. or more, and more especially to the more difficult to treat narrow boiling distillates, having a 90%–20% boiling range of less than 100° C., especially of less than 85° C.

The fuel oil may comprise atmospheric distillate or vacuum distillate, or cracked gas oil or a blend in any proportion of straight run and thermally and/or catalytically cracked distillates. The most common petroleum distillate fuels are kerosene, jet fuels, diesel fuels, heating oils and heavy fuel oils. The heating oil may be a straight atmospheric distillate, or it may contain minor amounts, e.g. up to 35 wt %, of vacuum gas oil or cracked gas oils or of both.

The invention is also applicable to vegetable-based fuel oils, for example rape seed oil, used alone or in admixture with a petroleum distillate oil.

In addition, the additive composition and the fuel oil composition may contain additives for other purposes, e.g., for reducing particulate emission or inhibiting colour and sediment formation during storage.

The fuel oil composition of the invention advantageously contains the macromolecular material or additive of the invention in a total proportion of 0.0005% to 2.5%, preferably 0.01% to 0.25% by weight, based on the weight of fuel.

The macromolecular material of the invention and the other cold flow improver are advantageously present in a weight ratio of from 1:15 to 1:1, preferably from 1:10 to 1:3.

The following Examples, in which parts and percentages are by weight unless otherwise indicated and acid numbers are expressed in mg KOH/g, illustrate the invention:

EXAMPLES 1 to 18

PreDaration of Macromolecular Materials

Example 1

Moiety A 500 parts of phenol and 153 parts of Amberlyst-15 (trade mark) catalyst were charged into a reaction vessel provided with an inlet, nitrogen purge, stirrer n thermometer. The mixture was heated to 75° C., and 506.1 parts of a crystalline $C_{30}+$ wax, Gulfteen 30+ (trade mark) having a terminal olefinic group and Mn of 478 were added over 1.5 hours with stirring. The temperature was then increased to 90° C., and maintained at that temperature for 5 hours with stirring. The reaction mixture was filtered and unreacted phenol distilled off under high vacuum. The FTIR spectrum of the product showed no sign of the terminal olefin peaks at 1644, 910, and 887 cm⁻, present in the wax reactant spectrum, but did show new peaks at 3615 and 3387 cm⁻, attributed to the phenolic hydroxy groups.

Example 2

Transesterification 3 parts (molar proportion 53) of the product of Example 1 and 11 parts (molar proportion 48) of the chloromethyl phenol ester of a carboxy-terminated ethylene-butene copolymer (ethylene content 45%, molecular weight ~2200) were heated to 80° C., and 0.0148 parts (molar proportion 2) of boric acid and 0.0235 parts (molar proportion 2) of sulphuric acid were added. The temperature was raised to 110° C. and stirred for 3 hours under vacuum (0.1 mm Hg). The IR spectrum showed a shift of the ester carbonyl peak from 1959 $cm^{-1}$ to 1953 $cm^{-1}$ on transesterification. The chlorine content fell from 1.39%, for the starting ester, to 0.088%.

Example 3

Transesterification

The procedure of Example 2 was repeated, but using 4 molar proportions of each of the boric and sulphuric acid catalysts, and the reaction was carried out at 120° C. for 30 minutes. The same IR shift was noted; the chlorine content of the product was 0.195%.

Example 4

Koch Reaction Esterification 75 parts (molar proportion 1316) of the product of Example 1 and 347.4 parts (molar proportion 1579) of a terminally unsaturated ethylene-butene copolymer, ethylene content 45%, Mn 2200, were charged into a pressure reactor containing 13.4 parts (molar proportion 1974) $BF_3$ and carbon monoxide at 500 psi (about 3.45 MPa). The carbon monoxide pressure was increased to 1500 psi (about 10.3 MPa), and the reactor maintained at 110° C. for 1 hour. After removal of $BF_3$ and CO, the ester product was recovered, showing an ester IR peak at 1751 $cm^{-1}$.

Example 5

15 parts of a hydroxy-terminated non-crystalline ethylene-butene copolymer (Kraton L-1203 (trademark and product of Shell), 52.8% (68.4% mole %) ethylene, 46.52% (30.13 mole %) butene, 0.68% (1.46 mole %) hydroxy groups) and 1.5 parts of a linear, saturated, carboxylic acid-terminated crystalline ethylene polymer (Unicid 425 Acid, trademark and product of Petrolite, molecular weight 425 by VPO, acid number 94) were charged to a vessel equipped with an inlet, nitrogen purge stirrer and thermometer. The mixture was heated to 160° C., 0.35 parts of p-tosyl acid were added, and the temperature maintained at 160° C. for 16 hours; product details are given in the table following Example 7.

Example 6

The procedure of Example 5 was repeated but using 2 parts of Unicid 550 Acid polymer, molecular weight 550, acid number 72.5.

Example 7

The procedure of Example 5 was repeated but using 2.5 parts of Unicid, 700 Acid polymer, molecular weight 700, acid number 63.

| Example | Peak m. w. | Mw | Mw/Mn |
| --- | --- | --- | --- |
| 5 | 5240 | 5319 | 1.05 |
| 6 | 5392 | 5736 | 1.08 |
| 7 | 5606 | 5753 | 1.06 |
| (Kraton L-1203) | 4799 | 4798 | 1.04 |

Example 8

3 parts (1 molar proportion) of a substantially terminally unsaturated crystalline ethylene-1-butene corolymer (Mn 1300, 12 mole % butene) and 2.76 parts (1 molar proportion) of a phenol-terminated non-crystalline ethylene propene polymer (Mn 1100, low ethylene content) were charged to a round-bottom flask equipped with a condenser and dropping funnel together with 100 parts by volume chlorobenzene and 30 parts of Amberlyst 15. The reaction mixture was stirred under nitrogen, the vessel immersed in a preheated oil bath at 120° C., and maintained at that temperature for 4 hours. After cooling to room temperature, the reaction mixture was filtered, and the solvent evaporated from the filtrate on a rotary evaporator to recover the product. The terminal olefin peaks in the FTIR spectrum of the starting ethylene-butene polymer were absent from the spectrum of the product and new peaks appeared at 3614 and 3362 $cm^{-1}$.

Example 9

3 parts (1 molar proportions) of the crystalline ethylene-1-butene copolymer used in Example 8 and 2.5 parts (1 molar proportion) of a substantially terminally unsaturated non-crystalline ethylene-propene copolymer (Mn 1100, low ethylene content) were charged to a round-bottom flask equipped with a condenser and dropping funnel together with 60 parts by volume chlorobenzene. To this mixture were added 0.868 parts (4 molar proportions) phenol dissolved in 15 parts by volume chlorobenzene and 3 parts of Amberlyst 15, the reaction mixture being stirred under nitrogen. The vessel was immersed in a preheated oil bath at 120° C., maintained at that temperature for 4 hours, and the product recovered as described in Example 8. FTIR analysis showed that the terminal olefin peaks at 1650 and 887 $cm^{-1}$ in the starting polymers were absent from the product and new peaks at 3614 and 3356 $cm^{-1}$ had appeared.

Example 10

The procedure of Example 4 was repeated, but employing 92.12 parts (molar proportion 13.16) of a crystalline aliphatic hydroxy-terminated polyethylene, mw 700, prepared analogously to the product of Example 1, 347.4 parts (molar proportion 1579) of the ethylene-butene copolymer used in Example 4, 13.4 parts (molar proportion 1974) $BF_3$, and carbon monoxide pressurized to 1414 psig (about 9.75 MPa) to yield a Koch-linked PE-PEB ester.

Example 11

The procedure of Example 8 was followed, but using 347.4 parts (molar proportion 1579) of an amorphous ethylene-butene polymer, Mn 2200, 75 parts molar proportion 1316) of a phenol-terminated crystalline $C_{34}$ wax, and $BF_3$ (13.4 parts, molar proportion 1974) as coupling agent instead of Amberlyst 15, yielding a $C_{34}$-PEB ester.

Example 12

The procedure of Example 4 was followed using 2.5 parts (molar proportion 36) of a pre-formed carboxy terminated polyethylene (Mn 700) as the crystalline block and 6.4 parts (molar proportion 43) of a phenol-terminated ethylene-butene polymer (low ethylene content, Mn 1500) as the non-crystalline block, linkage being catalysed by sulphuric acid (0.175 parts, molar proportion 2) to give a PE-EB ester.

Example 13

In a round-bottom flask equipped with a condenser and dropping funnel were charged 2 parts of substantially terminally unsaturated crystalline ethylene-butene copolymer (Mn 1577, 18.3 molar % 1-butene) and 4 parts of a hydroquinone-terminated ethylene-propene copolymer (Mn 3050, low ethylene), together with 100 parts by volume chlorobenzene and 15 parts of Amberlyst-15. The mixture was stirred under nitrogen, the vessel immersed in a preheated oil bath at 120° C., and maintained at that temperature for 4 hours. After cooling to room temperature, the reaction mixture was filtered and the solvent evaporated from the filtrate on a rotary evaporator to recover the product. The terminal olefin peaks at 1650 and 887 $cm^{-1}$ in the reactant ethylene butene copolymer FTIR spectrum were absent from the spectrum of the product, an EP-EB ester.

Example 14

In a round-bottom flask equipped with a condenser and dropping funnel were charged 2.8 parts of the crystalline ethylene-butene copolymer used in Example 13, 5.4 parts of a substantially terminally unsaturated non-crystalline ethylene-propene copolymer (low ethylene, Mn 3050) and 60 parts by volume chlorobenzene. To the resulting solution were added 0.79 parts of hydroquinone and 3 parts of Amberlyst-15. The procedure of Example 13 was followed. The terminal olefin peaks at 1650 and 887 $cm^{-1}$ in the FTIR spectrum of the starting materials were absent from the spectrum of the product, an EP-EB ester which showed new peaks at 3615 and 3478 $cm^{-1}$.

Example 15

The procedure of Example 8 was followed, but using 5.04 parts of a phenol-terminated ethylene-propene copolymer (Mn 1100, prepared by the procedure of Example 1) to provide the crystalline block and 1 part of a terminally unsaturated ethylene-butene copolymer (Mn 5000) to provide the non-crystalline block. 0.75 parts of Amberlyst-15 and 50 parts by volume of chlorobenzene were used.

Example 16

The procedure of Example 8 was followed, using 1.65 parts of crystalline ethylene propylene polymer, Mn 1100, and 8.4 parts of phenol-terminated non-crystalline ethylene-butene copolymer (Mn 5000, prepared using the procedure of Example 1). 0.75 parts of Amberlyst-15 and 25 parts by volume of chlorobenzene were used.

Example 17

37.5 parts (molar proportion 658) of the crystalline product of Example 1 and 434.2 parts (molar proportion 789) of a terminally unsaturated non-crystalline ethylene-butene copolymer were linked by the procedure of Example 4, using 6.6 parts (molar proportion 987) of $BF_3$ and carbon monoxide at 1500 psi (about 10.3 MPa).

Example 18

20.4 parts of the product of Example 17 were post-treated with boric acid (0.05 parts) and sulphuric acid (0.8 parts) at 150° C. for 24 hours.

Comparative Examples A to E

Polyethylene-polyethylenebutene (PEPEB) and polyethylene-polyethylene propene (PEPEP) block polymers were made by prior art methods of two stage polymerization followed by hydrogenation. The polymers were as follows:

| Example | Structure | Mn, PE | Mn, PEP or PEB |
|---|---|---|---|
| A | PEPEP | 1500 | 1500 |
| B | PEPEP | 1500 | 5000 |
| C | PEPEP | 2500 | 5000 |
| D | PEPEB | 1500 | 5000 |
| E | PEPEB | 3500 | 5000 |

In all samples, the polyethylene block was crystalline, with 2% $C_2$ branching. In all samples, the other block was oil soluble, the PEP block having about 25% methyl branching and the PEB blocks having about 14% $C_2$ branching.

In the following examples, the products of the invention were tested to evaluate their ability to improve the low temperature properties of three fuels, as measured by their CFPPs, as described in BS 2869 and the Journal of the Institute of Petroleum, 52(1966)173 and compared with prior art materials. The properties of the fuels were as follows:

|  | Fuel A | Fuel B |
|---|---|---|
| Cloud Point ° C. | +1 | −5 |
| CFPP, ° C. | 0 | −7.5 |
| IBP, ° C. | 177 | 261 |
| FBP, ° C. | 367 | 363 |
| 90-20, ° C. | 102 | 63 |
| FBP-90° C. | 19 | 30 |
| WAT, ° C. | −3.3 | −8.8 |
| % Wax at 5° C. below Cloud Point | 2.1 | 1.5 |

In addition to comparison products A to E, the following materials were used in the tests.

Additive F, ethylene-vinyl acetate copolymer, 36% vinyl acetate, Mn 3300, an arrestor Additive G, the half amide, half amine salt reaction product of one mole of phthalic anhydride and two moles of di(hydogenated tallow) amine, an arrestor.

Additive H, ethylene-vinyl acetate copolymer, 13% vinyl acetate, Mn 6500, a nucleator.

Additive J, a polyethylene glycol ester (PEG ester) nucleator.

Examples 19 to 33 and Comparisons K to P

In these tests, the macromolecular products of the invention "inv." and Comparison Products A to E, generally regarded as nucleators, were used in combination with arrestor additive F at a ratio of F:inv. of 4:1, and in combination with arrestor additive G at a ratio of G:inv. of 3:1, at various total treat rates as shown below.

|  |  | Fuel A | | Fuel B | |
|---|---|---|---|---|---|
|  |  | Treat Rate, ppm | | | |
| Material of Example No. | Example No. | 400 | 600 | 200 | 400 |
|  |  | CFPP° C. | | CFPP° C. | |
| A | K | −9 | −16 | −19 | −20 |
| B | L | −10 | −13 | −20 | −19 |
| C | M | −5 | −13 | −20 | −19 |
| D | N | −10.5 | −13.5 | −17 | −19 |
| E | P | −3.5 | −10 | −17 | −18.5 |
| 4 | 19 | −9 | −14 | −13 | −17 |
| 5 | 20 | −4 | −9 | −11 | −17 |
| 6 | 21 | −5 | −12 | −11 | −19 |
| 7 | 22 | −5 | −14 | −18 | −19 |
| 8 | 23 | −2 | −7 | −13 | −19 |
| 9 | 24 | −5 | −10 | −14 | −18 |
| 10 | 25 | −3 | −10 | −15 | −19 |
| 11 | 26 | −4 | −7 | −9 | −18 |
| 12 | 27 | −2 | −8 | −12 | −16 |
| 13 | 28 | −3 | −9 | −15 | −19 |
| 14 | 29 | −2 | −8 | −15 | −18 |
| 15 | 30 |  |  | −14 | −17 |
| 16 | 31 |  |  | −16 | −17 |
| 17 | 32 |  |  | −13 | −15 |
| 18 | 33 |  |  | −16 | −17 |

The results show that the macromolecular materials of the invention give comparable CFPP lowering to that achieved by the PEPEP and PEPEB materials made by the prior art methods.

Example 34 and Comparisons Q and R

As indicated above, a typical cold flow improver composition contains a nucleator and an arrestor, and in many commercial products these are both ethylene-vinyl acetate (EVA) copolymers. Additives F and H are a typical arrestor and nucleator respectively. In other commercial products, the nucleator is a PEG ester; additive J is a typical PEG ester nucleator. In Fuel A, a fuel difficult to treat, the following CFPP results were obtained at the treat rates shown using a combination of additives F and H, and a combination of additives F and J, both at a ratio of 4:1, and a combination of additive F and the product of Example 7 at the same ratio.

|  |  | CFPP, ° C., at Treat Rate; ppm: | | | |
|---|---|---|---|---|---|
| Example | Materials | 200 | 400 | 600 | 800 |
| Q | F & H | −2 | −4 | −9 | −12 |
| R | F & J | −1 | −1 | −5 | −5 |
| 34 | F & 7 | −2 | −5 | −14 | −15 |

The results show that Fuel A is more responsive to an additive containing the macromolecular material of the invention as nucleator than one containing a conventional EVA copolymer nucleator and much more than to one containing a PEG ester as nucleator.

Examples 35 to 37

The product of Example 7 was evaluated alone, and in combination with addives F and G, in Fuel B. The CFPP results are shown below:

| Example | Materials | CFPP, °C., at Treat Rate; ppm: | | | |
|---|---|---|---|---|---|
| | | 200 | 400 | 600 | 800 |
| 35 | 7 alone | −13 | −13 | −15 | −15 |
| 36 | 7 and F | −18 | −19 | −17 | −23 |
| 37 | 7 and G | −9 | −18 | −20 | −19 |

The results show that in Fuel B the macromolecular material of the invention has substantial CFPP depressant activity.

What is claimed is:

1. An additive composition comprising:
    (a) a macromolecular material of the formula AB, comprising a moiety A being a wax having a molecular weight within the range of from 400 to 7000, containing an alkyl or alkylene chain, and having a linearity such that its degree of crystallinity is at least 25%, and a moiety B imparting oil solubility to the material, moiety B having a degree of crystallinity of at most 10%, the moieties A and B being linked by a bond other than a carbon to carbon bond, or being linked by a functional group; and
    (b) a terpolymer of ethylene, vinyl acetate, and a vinyl ester of a $C_2$ to $C_{10}$ alkane carboxylic acid.

2. The composition as claimed in claim 1, wherein moieties A and B in the macromolecular material are linked by a functional group which is the reaction product of nucleophilic and electrophilic groups.

3. The composition as claimed in claim 2, wherein the linkage is derived from a phenol or hydroquinone residue.

4. The composition as claimed in claim 1, wherein the alkane carboxylic acid is 2-ethylhexanoic acid.

5. The composition as claimed in claim 1 wherein the B moiety is a polymer which has a molecular weight of 2000 to 20,000.

6. An additive concentrate comprising the additive composition of claim 1 in an oil or a solvent miscible with oil.

7. A fuel or lubricating oil composition comprising the additive composition claim 1.

* * * * *